(12) United States Patent
Ijima et al.

(10) Patent No.: US 6,587,283 B2
(45) Date of Patent: Jul. 1, 2003

(54) OPTICAL-COMPONENT-INTEGRATED OPTICAL PICKUP

(75) Inventors: Shinichi Ijima, Takatsuki (JP); Kazuhiko Yamanaka, Takatsuki (JP); Kazutoshi Onozawa, Takatsuki (JP); Hideyuki Nakanishi, Otsu (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 52 days.

(21) Appl. No.: 09/820,958

(22) Filed: Mar. 29, 2001

(65) Prior Publication Data

US 2001/0026406 A1 Oct. 4, 2001

(30) Foreign Application Priority Data

Mar. 29, 2000 (JP) ........................................ 2000-092385

(51) Int. Cl.[7] ................................................. G02B 7/02
(52) U.S. Cl. ........................................ 359/824; 359/814
(58) Field of Search ............................... 359/813, 814, 359/823, 824; 369/44.15, 44.16, 112.01

(56) References Cited

U.S. PATENT DOCUMENTS

| | | | |
|---|---|---|---|
| 5,241,528 A | 8/1993 | Mohri et al. | 369/219 |
| 5,440,533 A * | 8/1995 | Fujimaki et al. | 369/44.18 |
| 5,581,533 A | 12/1996 | Fujisawa | 369/112.23 |
| 6,005,749 A * | 12/1999 | Ikuta et al. | 360/99.12 |
| 6,181,670 B1 * | 1/2001 | Nagasato | 369/244 |
| 6,208,610 B1 * | 3/2001 | Kawakami et al. | 369/112.01 |
| 6,307,687 B1 * | 10/2001 | Nishikawa | 359/814 |
| 6,341,104 B1 * | 1/2002 | Yamaguchi et al. | 359/44.14 |
| 6,377,521 B1 * | 4/2002 | Kijima et al. | 369/44.23 |
| 6,473,248 B1 * | 10/2002 | Nakanishi et al. | 359/824 |

FOREIGN PATENT DOCUMENTS

| | | |
|---|---|---|
| JP | 9-274727 | 10/1997 |
| JP | 2000-276748 | 10/2000 |

* cited by examiner

*Primary Examiner*—Ricky Mack
*Assistant Examiner*—Brandi N Thomas

(57) ABSTRACT

An optical pickup is equipped with: an enclosure which contains an optical system including a semiconductor laser and an objective lens; a fixed member; and an elastic supporting member which has conductivity and movably supports the enclosure. A plurality of pairs of driving coils are each positioned in the enclosure so as to be symmetrical with respect to an optical axis of a laser beam. The plurality of pairs of driving coils generate magnetic forces with a plurality of magnets or the like, to drive the enclosure in a focusing direction and a tracking direction.

10 Claims, 6 Drawing Sheets

TRACKING DIRECTION

OPTICAL-COMPONENT-INTEGRATED OPTICAL PICKUP

This application is based on an application No. 2000-92385 filed in Japan, the content of which is hereby incorporated by reference.

BACKGROUND OF THE INVENTION

1. Field of the Invention

The present invention relates to an optical pickup that is used to read and write information from and onto an optical recording medium.

2. Related Art

Optical pickups are used when recording/reproducing information for optical recording media such as CDs (compact disks) and DVDs (digital versatile disks). An optical pickup typically includes a movable member and a fixed member. The movable member carries an objective lens for focusing a laser beam onto an optical recording medium, and is made movable so that the objective lens can move in a focusing direction and tracking direction of the optical recording medium. The fixed member supports the movable member. In recent years, a type of optical pickup that has a movable member carrying all optical components of an optical system including an objective lens and a semiconductor laser which emits a laser beam has been proposed (such an optical pickup is hereafter called "optical-component-integrated optical pickup" or simply "integrated optical pickup").

In the optical-component-integrated optical pickup, the entire optical system is mounted in the movable member. When compared with an optical-component-separated optical pickup that mounts the semiconductor laser and the like in the fixed member and moves only the objective lens, the integrated optical pickup does not suffer from degradation in optical properties when the objective lens is moved. Hence stable optical properties can be obtained.

A conventional optical-component-integrated optical pickup is disclosed in Japanese Laid-Open Patent Application No. H07-114743. This optical pickup is provided with an elastic member which allows a movable member to move in a focusing direction, and a means which allows the movable member to rotate in a tracking direction. In this way, the position of the objective lens in the focusing and tracking directions can be adjusted.

In an optical system for recording/reproducing of a high-density optical recording medium such as a DVD, a numerical aperture of an objective lens is generally set large enough to realize high density. This makes it necessary to suppress the amount of tilt of the objective lens relative to the optical recording medium as small as possible. It is therefore desirable to use an actuator that follows the wobbling of the optical recording medium. However, the above conventional optical pickup uses the elastic member such as a flat spring to adjust the position of the objective lens in the focusing direction, thereby making it difficult to adjust the position of the objective lens in the tilting direction.

Also, it is desirable that normal-density optical recording media such as CDs can be reproduced by an apparatus used for recording/reproducing of high-density optical recording media such as DVDs. Furthermore, it is desirable that a plurality of types of optical recording media can be recorded/reproduced by a single optical pickup. Here, a 3-beam method is the most reliable and pervasive tracking error detection method used for reproduction of CDs. Also, a differential push-pull method is used in many optical pickups for recording/reproducing write-once optical recording media such as CD-Rs. Both methods detect a tracking error by focusing three spots of light onto an optical recording medium.

However, the above conventional integrated optical pickup has the following problem. When a tracking error detection method such as the 3-beam method or the differential push-pull method that puts importance on the positional relationship between the spot of light and the track on the optical recording medium is employed in the conventional optical pickup in which the movement of the movable member in the tracking direction is a rotary motion, the positional relationship between the spot and the track constantly changes, which causes variations in amplitude of a tracking error signal.

Also, in an optical-component-integrated optical pickup, the entire optical system is mounted in the movable member. This makes it necessary to install electrical wiring in order to supply drive currents to the semiconductor laser and drive voltages to a photodetector substrate which receives light returning from the optical recording medium, and to send signals detected by the photodetector to a processing circuit equipped in the fixed member. In the aforementioned conventional integrated optical pickup, however, the movable member is connected to the elastic member such as a flat spring to move in the focusing direction, while it is necessary to rotate the movable member in the tracking direction. This being so, even if the member that connects the fixed member and the movable member is conductive, signal lines necessary to exchange electrical signals between the movable member and the outside cannot be secured. Therefore, necessary signal lines have to be secured by using another wiring member such as a flexible printed circuit. This not only increases the number of components, but also tends to cause a problem that signal lines which behave as lines through space affect the properties of the actuator.

Moreover, in an optical pickup provided for high-density optical recording media such as DVDs, the distance from the emission point of the semiconductor laser 113 to the information recording surface of the optical recording medium 107 (such a distance is hereafter called "overall distance") is generally long around 20 mm. Here, the placement of the optical components has to be done such that the beam from the semiconductor laser to the objective lens avoids magnetic circuits used for adjusting the position of the movable member in the focusing and tracking directions. Though it is not unthinkable to provide only one magnetic circuit in the optical pickup, such a construction may give rise to the need to keep the weight balance of the movable member by loading weights or similar into the movable member, which results in an increase of the weight of the movable member.

SUMMARY OF THE INVENTION

The object of the present invention is to provide an optical-component-integrated optical pickup that has stable optical properties and is capable of carrying a compact optical system with the overall distance being around 20 mm.

The stated object can be fulfilled by an optical pickup including: a semiconductor laser which emits a laser beam; an objective lens which focuses the emitted laser beam on an optical recording medium; an enclosure which contains an optical system that includes the semiconductor laser and the objective lens; an elastic supporting member which movably supports the enclosure; and a plurality of pairs of driving coils which are contained in the enclosure, each pair being positioned symmetrically with respect to an optical axis of the laser beam, wherein the plurality of pairs of driving coils generate magnetic forces with a plurality of magnets, to drive the objective lens at least in a focusing direction and a tracking direction.

With this construction, an optical pickup with a long overall distance can be realized without increasing a weight of an enclosure which is a movable member.

The object can also be fulfilled by an optical pickup including: a semiconductor laser which emits a laser beam; an objective lens which focuses the emitted laser beam on an optical recording medium; an enclosure which contains an optical system that includes the semiconductor laser and the objective lens; an elastic supporting member which movably supports the enclosure; and a plurality of magnets which are contained in the enclosure and positioned symmetrically with respect to an optical axis of the laser beam, wherein the plurality of magnets generate magnetic forces with a plurality of pairs of driving coils, to generate magnetic fluxes for driving the objective lens at least in a focusing direction and a tracking direction.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings.

DESCRIPTION OF THE PREFERRED EMBODIMENT(S)

Figure 1:
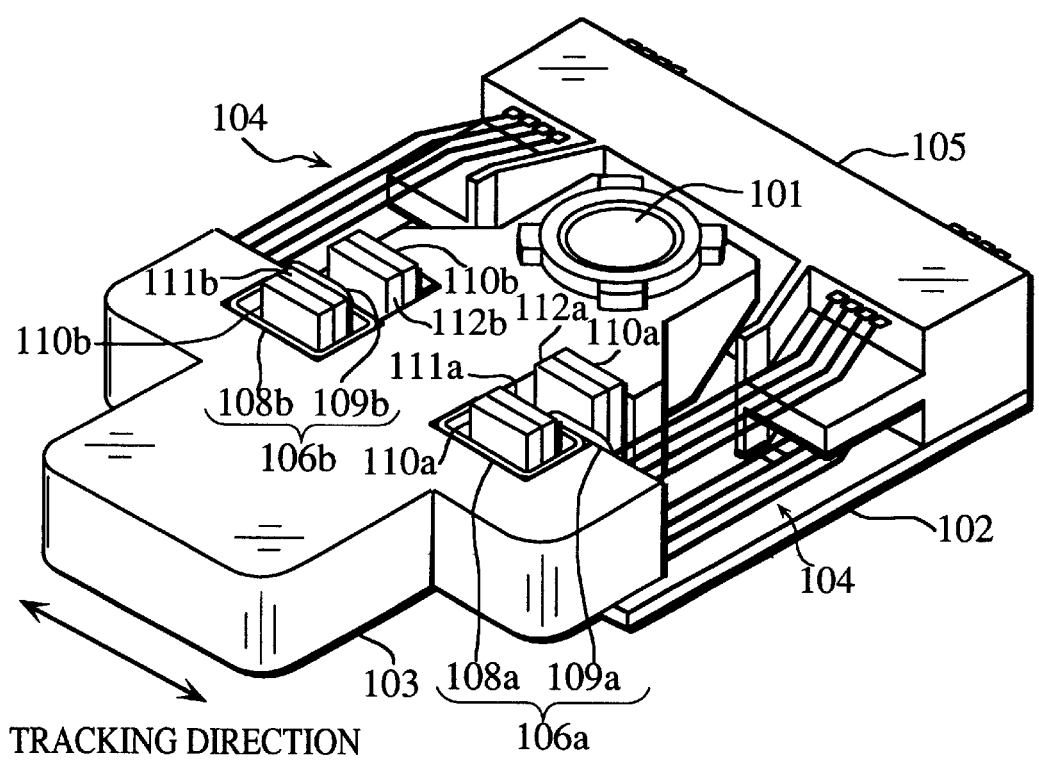
FIG. 1 is a perspective view of a main construction of an optical pickup according to an embodiment of the invention.
Figure 2:
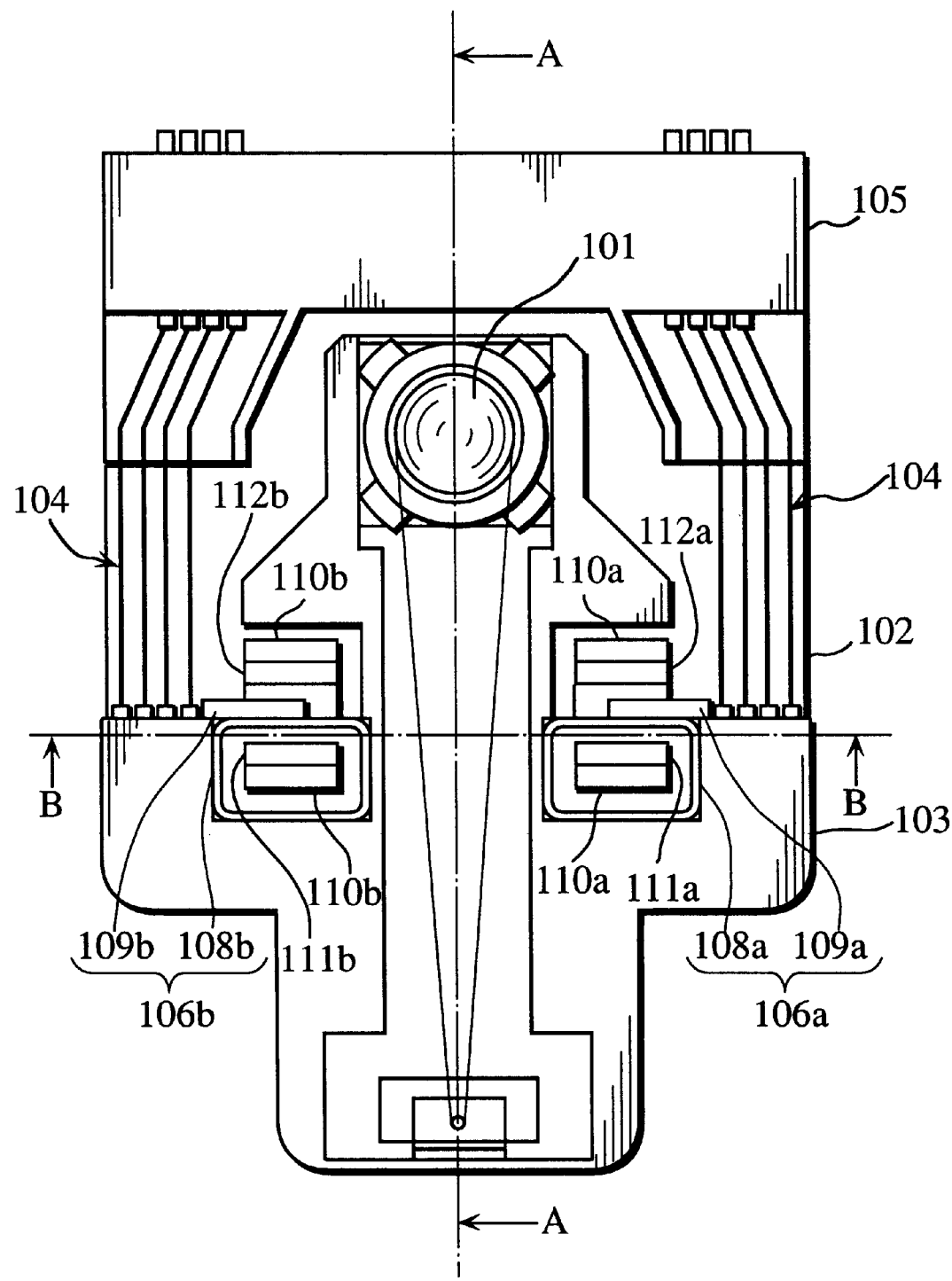
FIG. 2 is a top view of the optical pickup shown in FIG. 1.
Figure 3:
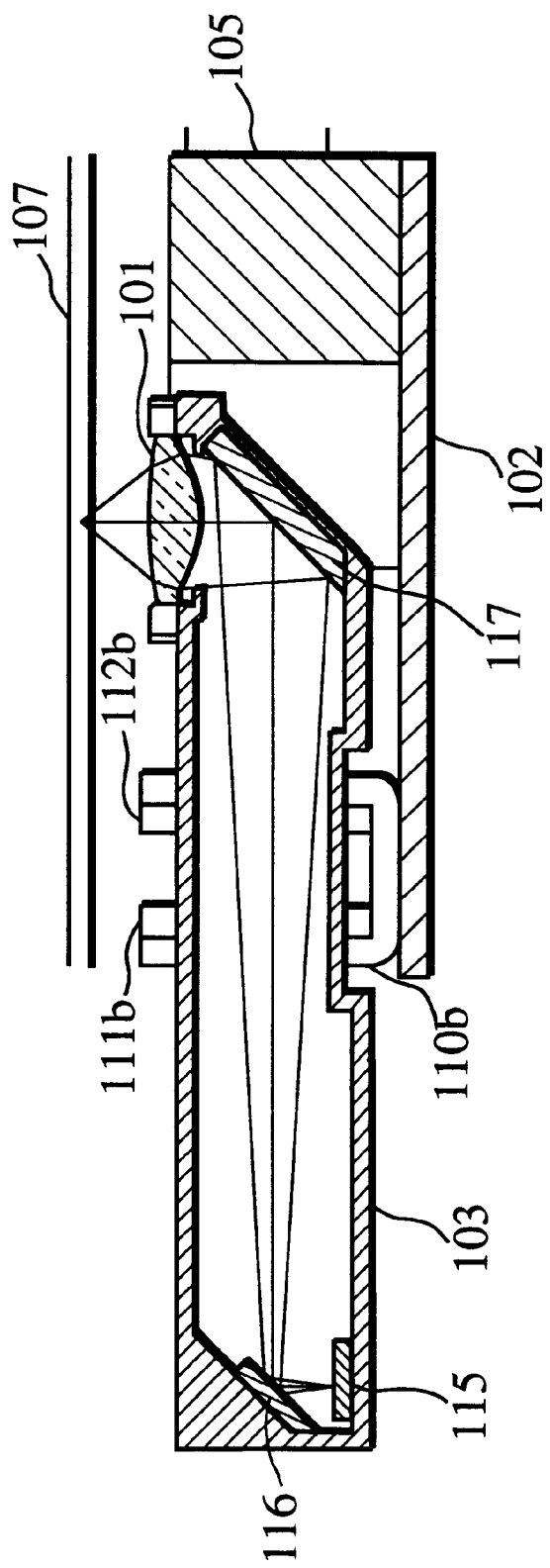
FIG. 3 is a sectional view of an inner construction of an enclosure taken along the line marked A—A in FIG. 2.

The following is a description of an embodiment of an optical pickup of the present invention, with reference to the drawings. FIG. 1 is a perspective view showing a main construction of an optical pickup according to the embodiment. FIG. 2 is a top view of the optical pickup shown in FIG. 2, and FIG. 3 is a sectional view taken along the line A—A in FIG. 2.

As shown in each of the drawings, the embodied optical pickup has an enclosure 103 that is a movable member carrying all components of an optical system (described later) including an objective lens 101. The enclosure 103 is connected to and supported by a fixed member 105 via sixteen elastic supporting members 104 which possess conductivity. The fixed member 105 is fixed onto an optical base 102.

Four driving coils 106a and 106b which generate electromagnetic driving forces for adjusting the position of the objective lens 101 are positioned in the enclosure 103 so as to be symmetrical with respect to an optical axis of a laser beam (described later). The driving coils 106a and 106b include focusing coils 108a and 108b for driving the entire enclosure 103 in a focusing direction that focuses on an optical recording medium 107, and tracking coils 109a and 109b for driving the entire enclosure 103 in a tracking direction that substantially traverses the focusing direction. Also, four magnets 111a, 112a, 111b, and 112b (collectively called "magnets 111") are held by yokes 110a and 110b fixed onto the optical base 102. The magnets 111 and the driving coils 106a and 106b form magnetic circuits for adjusting the position of the enclosure 103.

This optical pickup is designed so that magnetic fluxes produced by the driving coils 106a and 106b intersect the tracking direction at right angles, and magnetic fluxes produced by the magnets 111 intersect the tracking direction at right angles. The tracking coils 109a and 109b are electrically connected in series to each other, and connected to the outside so that tracking drive currents flow through the elastic supporting members 104. On the other hand, the focusing coils 108a and 108b are insulated from each other, and connected to the outside by two sets of focus drive current supplying lines included in the elastic supporting members 104.

Figure 4:
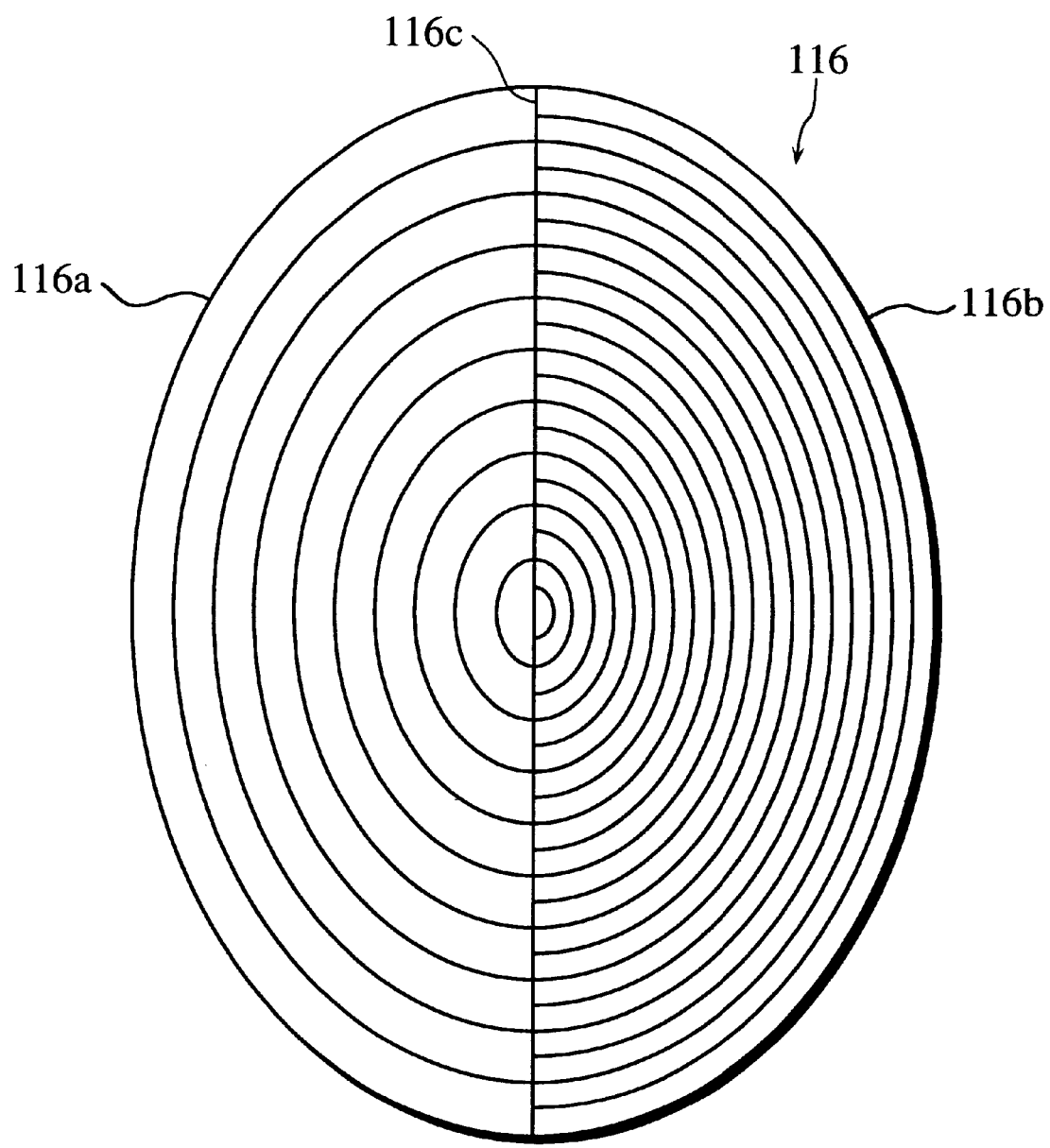
FIG. 4 is a conceptual view of a construction of a reflecting hologram optical component shown in FIG. 3.

A light emitting/receiving integrated component 115 which includes a semiconductor laser 113 and a photodetector substrate 114 (see FIG. 5), a reflecting hologram optical component 116, and a raising mirror 117 are disposed in the enclosure 103, as shown in FIG. 3. FIG. 4 is a conceptual view of a construction of the reflecting hologram optical component 116. The reflecting hologram optical component 116 is divided by a dividing line 116c that is parallel to the track of the optical recording medium 107 into two hologram regions 116a and 116b, in each of which return light from the optical recording medium 107 is reflected and diffracted. The reflecting hologram optical component 116 has a wavefront converting function (i.e. lens effect) that provides a different focal distance to positive first-order diffracted light and negative first-order diffracted light which are diffracted by the same hologram region. Also, the reflecting hologram optical component 116 has a curve pattern which is determined in consideration of incidence angle dependency when the light is reflected. Furthermore, the hologram regions 116a and 116b have diffraction gratings whose pitches are different so as to provide a different diffraction angle between the hologram regions 116a and 116b.

Figure 5:
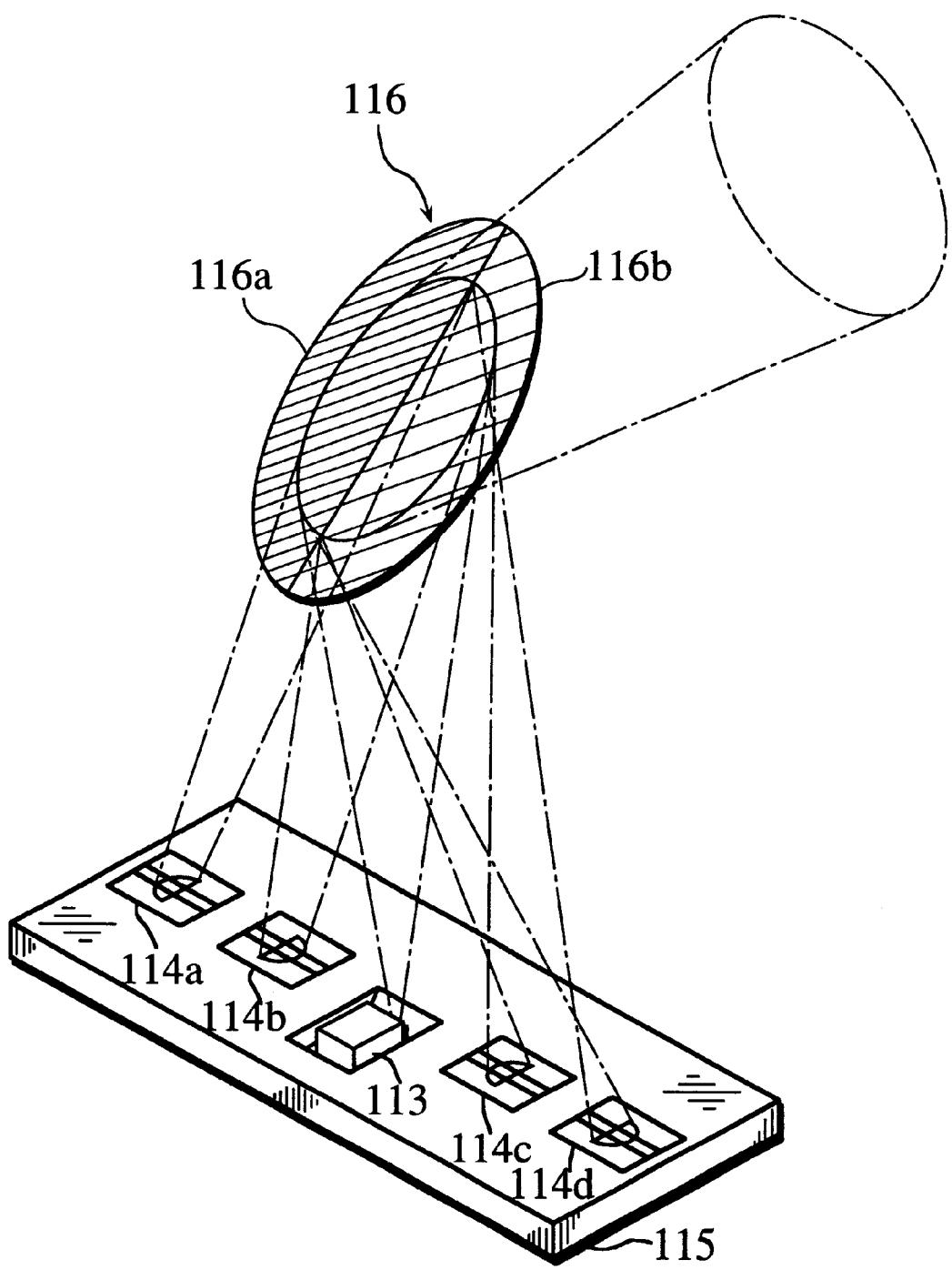
FIG. 5 is a perspective view of a construction of a light emitting/receiving integrated component shown in FIG. 3.

FIG. 5 is a perspective view of a construction of the light-emitting/receiving integrated component 115. In the drawing, the semiconductor laser 113 and the photodetector substrate 114 are provided on the light emitting/receiving integrated component 115. On the photodetector substrate 114, three-part split photodetectors 114a, 114b, 114c, and 114d are provided so that positive first-order diffracted light and negative first-order diffracted light, which have been diffracted by the hologram regions 116a and 116b, are focused onto these photodetectors 114a–114d. Through the use of these photodetectors 114a–114d, focusing error detection is performed according to a spot size detection system which detects differences in spot diameter of the positive and negative first-order diffracted light. Meanwhile, tracking error detection is performed according to a push-pull method which detects differentials between the reflected beams corresponding to the hologram regions 116a and 116b that are divided by the dividing line 116c.

In this embodiment, the magnetic circuits formed by the driving coils 106a and 106b and the magnets 111 are divided into two separate parts with the optical axis interposed in between, as can be seen in FIG. 2. Accordingly, it is possible for the enclosure 103 to contain an optical system whose overall distance is long around 20 mm. Also in this embodiment, the objective lens 101 and the light emitting/receiving integrated component 115 are positioned at opposite ends of the enclosure 103 so as to be almost symmetrical to each other with respect to the straight line that connects the center of the driving coil 106a and the center of the driving coil 106b. This, together with other factors such as the adjustment of the weight of the light emitting/receiving integrated component 115, makes it unnecessary to adjust the position of the center of gravity of the enclosure 103 by loading additional weights or the like into the enclosure 103.

As a result, the center of driving force generated by the driving coils 106a and 106b, the center of gravity of the enclosure 103, and the center of support by the elastic supporting members 104 coincide with each other in the direction of the optical axis (more precisely, a direction that is perpendicular to both the tracking direction and the focusing direction, hereafter called "longitudinal direction"), without unnecessarily increasing the weight of the enclosure 103 which is the movable member.

Also, the driving coils 106a and 106b, the semiconductor laser 113, and the photodetector substrate 114 are all electrically connected to the elastic supporting members 104, so that no signal lines are necessary to connect the enclosure 103 and the fixed member 105 except the elastic supporting members 104. In other words, all supplies of voltages and currents can be conducted through the elastic supporting members 104. The elastic supporting members 104 can be formed from a conductive material such as a copper alloy e.g. phosphor bronze, titanium copper, or beryllium copper.

In this embodiment, sixteen conductive members are provided as the elastic supporting members 104. The provision of such a relatively large number of supporting members 104 has the effect of enhancing the resistance of the entire optical pickup against disturbances. As a result, the optical pickup can more easily follow movements of the optical recording medium 107 in the focusing and tracking directions, and an external control circuit provided to control the position of the enclosure 103 in both directions can be simplified. This effect can be achieved not only when the number of supporting members 104 is sixteen but also when the number of supporting members 104 is at least five or six.

To improve the resistance against disturbances, the number of elastic supporting members 104 is preferably an even number so that the supporting members 104 are positioned bilaterally symmetrical with respect to the optical axis which extends in the longitudinal direction, or the number of elastic supporting members 104 is preferably an integral multiple of four so that the supporting members 104 are positioned cubically symmetrical with respect to the optical axis. Also, the number of elastic supporting members 104 is preferably enough to provide power-supplying lines and signal lines necessary for each component contained in the enclosure 103. However, it is also possible to reduce the number of elastic supporting members 104 by reducing the necessary lines. This can be done, for instance, by mounting not the driving coils 106a and 106b but the magnets 111 into the enclosure 103 to form the magnetic circuits, or by mounting not the photodetector substrate 114 but only the semiconductor laser 113 into the enclosure 103.

Figure 6:
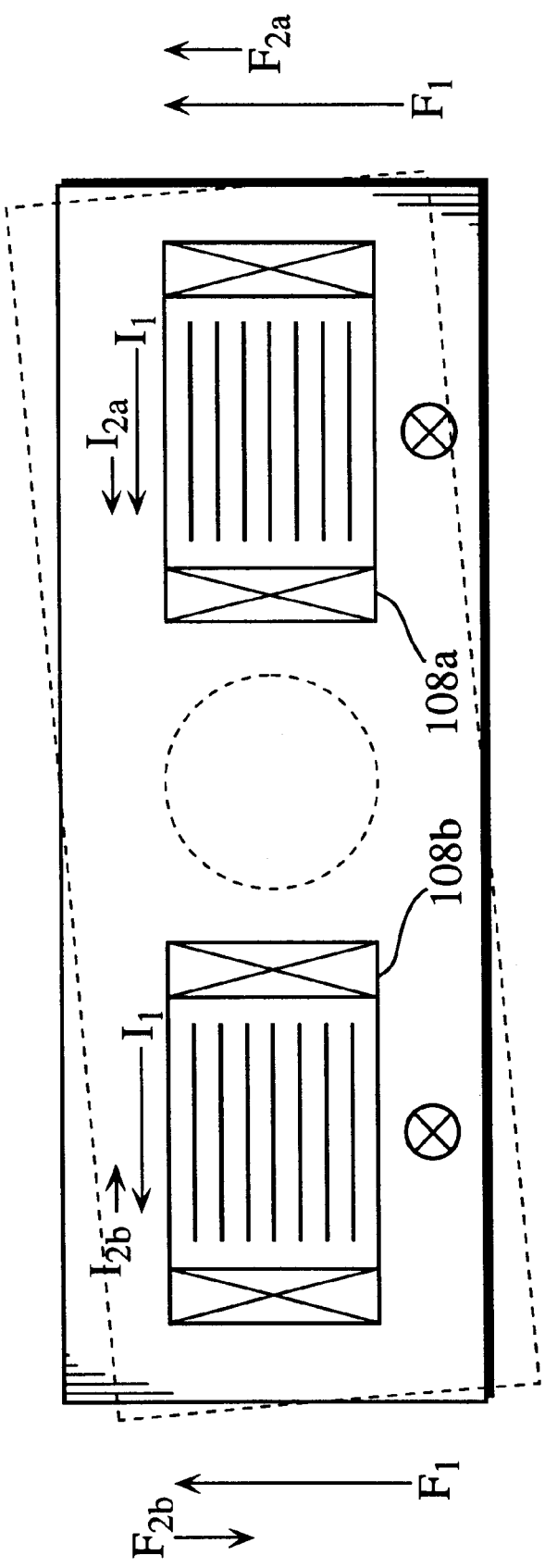
FIG. 6 is a schematic sectional view taken along the line marked B—B in FIG. 2, to explain operations of the optical pickup.

The following is an explanation on operations of the above constructed optical pickup. FIG. 6 is a schematic sectional view taken along the line B—B in FIG. 2, to explain the operations of the optical pickup.

A laser beam emitted from the semiconductor laser 113 in the enclosure 103 passes between the driving coils 106a and 106b, and is focused onto the optical recording medium 107 by the objective lens 101 via the raising mirror 117. This beam is then reflected by the optical recording medium 107, and the resulting return beam reverses along the same optical path and is diffracted by the reflecting hologram optical component 116. The diffracted return beam is then received on the photodetector substrate 114, and a servo error signal and an information recorded signal recorded on the optical recording medium 107 are detected from the received beam, though the details of the signal detection processing is omitted here.

In FIG. 6, when performing the focus adjustment relative to the optical recording medium 107, drive currents $I_1$ of the same value are supplied to the focusing coils 108a and 108b, as a result of which electromagnetic forces $F_1$ are generated between the focusing coil 108 and the magnet 111a and between the focusing coil 108b and the magnet 111b. These electromagnetic forces $F_1$ enable the enclosure 103 to move in the focusing direction. After the focus servo is turned ON, currents are supplied to the tracking coils 109a and 109b, in order to have the laser beam follow the track on the optical recording medium 107. As a result of this current supply, electromagnetic forces are generated between the tracking coil 109a and the magnet 112a and between the tracking coil 109b and the magnet 112b, which enables the enclosure 103 to move in the tracking direction.

After the tracking servo is turned ON, this embodiment further performs control for adjusting the tilt of the optical pickup relative to the optical recording medium 107. This control is done by superposing tilt control components $I_{2a}$ and $I_{2b}$ on the drive currents $I_1$ for the focusing coils 108a and 108b so that the state of the information recorded signal detected from the beam received on the photodetector substrate 114 becomes most favorable, and supplying the resulting drive currents respectively to the focusing coils 108a and 108b. In this way, the driving forces which act on the focusing coils 108a and 108b are changed by $F_{2a}$ and $F_{2b}$ respectively, so that the position of the enclosure 103 can be adjusted in response to the tilt of the optical recording medium 107. This not only ensures more stable optical properties, but also achieves excellent optical properties even for high-density optical recording media such as DVDs that require high accuracy in the tilting direction.

The tilt control is explained in details below. When the optical recording medium 107 has, like a DVD, address regions arranged in a staggered pattern away from a track center (CAPA: Complimentary Allocated Pit Address), the tilt control is performed in the following manner. With the focus servo and the tracking servo being ON, the track center is detected by comparing an amplitude of a signal passing through the CAPA region which is on the left side of an optical spot passage direction, and an amplitude of a signal passing through the CAPA region which are on the right side of the optical spot passage direction.

By exercise control so as to make these two signal amplitudes equal, the optical spot can be focused along the track center. Under this control, there is no offset component of the objective lens 101, since the whole optical system moves in parallel. Therefore, the level of the tracking error signal is proportional only to the tilt component.

Accordingly, the tracking error signal is sent to the actuator as a tilt signal, and the tilt control (servo) operation is performed so that the change of the tracking error signal in the CAPA shows a symmetry.

Here, there is a predetermined relationship between the tilt signal and the amount of tilt of the information recording medium 107. Likewise, there is a predetermined relationship between the amount of tilt of the information recording medium 107 and the amount of tilt of the objective lens 101 which would optically optimize the optical spot on the optical recording medium 107. Further, given the sensitivity of the actuator to a drive signal in the tilt operation, the tile control components $I_{2a}$ and $I_{2b}$ which should be superposed onto the drive currents of the focusing coils 108a and 108b can be uniquely determined from the tilt signal, with it being possible to carry out the tilt control. Note here that the above relationships can be acquired in advance, for example when exchanging disks, and stored in tables.

On the other hand, when the optical recording medium 107 does not have the CAPA unlike a DVD, the tilt control can be performed as follows. Since the embodied optical pickup is an optical-component-integrated optical pickup, there is basically no objective lens offset component in the tracking error signal. In other words, the level of the tracking error signal is proportional only to the tilt component, so that this signal can be used as a tilt signal to exercise the tilt control in the same way as the above DVD, although the accuracy of detecting the track center is probably higher in the case of DVD having the CAPA.

Alternatively, to detect the information recorded signal in the most favorable state without depending on the type of optical recording medium, there is a method that monitors the information recorded signal and performs tilt control so as to minimize jitter or maximize the amplitude of the AC component of the information recorded signal.

The above embodiment describes the case where the driving coils 106a and 106b are mounted in the enclosure 103 while the magnets 111 are mounted in the optical base 102 via the yokes 110a and 110b. However, the driving coils 106a and 106b and the magnets 111 may be mounted respectively in the optical base 102 and the movable member (enclosure) 103, as noted earlier. With such a construction, it becomes unnecessary to supply drive currents to the driving coils 106a and 106b through the elastic supporting members 104, so that the number of elastic supporting members 104 can be reduced.

Also, the wavelength of the semiconductor laser 113 mounted in the enclosure 103 may be in the infrared wavelength range (about 800 nm), the red wavelength range (about 650 nm), or the blue wavelength range (about 400 nm). Also, the semiconductor laser 113 may have emission points that correspond to at least two wavelength ranges. When such a semiconductor laser is used together with an objective lens that corresponds to at least two wavelength ranges, a single optical pickup can perform recording/reproduction of various types of optical recording media such as CD-ROMs and DVDs. Alternatively, the semiconductor laser 113 may be replaced with two or more different semiconductor lasers with different wavelength ranges (hybrid packaging).

The above embodiment describes the case where the tilt adjustment is performed with the two focusing coils 108a and 108b being insulated from each other, but the two focusing coils 108a and 108b may be electrically connected in series. Though the optical pickup of this construction is devoid of the tilt control mechanism for high-density optical recording media, it can still be used for normal-density optical recording media.

Also, the optical system of the invention is not limited to a finite optical system, but may be an infinite optical system that uses a collimating lens.

The above embodiment describes the case where the overall distance is about 20 mm, but this is only because current DVD design technologies limit the overall distance to around 20 mm. Therefore, even if the overall distance becomes smaller in the future, the invention will be applicable.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optical pickup comprising;
   a semiconductor laser which emits a laser beam;
   an objective lens which focuses the emitted laser beam on an optical recording medium;
   an enclosure which contains an optical system that includes the semiconductor laser and the objective lens;
   an elastic supporting member which movably supports the enclosure; and
   a plurality of pairs of driving coils which are contained in the enclosure, each pair being positioned symmetrically with respect to an optical axis of the laser beam,
   wherein the laser beam passes through a space formed between the plurality of pairs of driving coils in a path that is substantially parallel with a surface of the optical recording medium, and
   wherein the plurality of pairs of driving coils generate magnetic forces with a plurality of magnets, to drive the objective lens at least in a focusing direction and a tracing direction.

2. The optical pickup of claim 1,
   wherein the objective lens and the semiconductor laser are positioned at opposite ends of the enclosure, so that a position of a center of gravity of the enclosure with the objective lens and the semiconductor laser in a direction of the optical axis substantially coincides with a position of a supporting point of the enclosure by the elastic supporting member in the direction of the optical axis.

3. The optical pickup of claim 2,
   wherein the elastic supporting member is made up of at least six conductive members, at least two of which function as lines for supplying electric power to the semiconductor laser.

4. The optical pickup of claim 1 further comprising
   a photodetector which is contained in the enclosure and receives a return beam generated as a result that the laser beam is reflected by the optical recording medium,
   wherein the elastic supporting member is made up of at least six conductive members, at least part of which functions as lines for supplying electric power to the semiconductor laser, the photodetector, and the plurality of pairs of driving coils.

5. The optical pickup of claim 4,
   wherein the plurality of pairs of driving coils include a plurality of focusing coils for adjusting a position of the enclosure in the focusing direction, the plurality of focusing coils being supplied with drive currents independently of each other.

6. The optical pickup of claim 1,
   wherein the elastic supporting member is made up of at least six conductive members, at least two of which function as lines for supplying electric power to the semiconductor laser.

7. An optical pickup comprising;

a semiconductor laser which emits a laser beam;

an objective lens which focuses the emitted laser beam on an optical recording medium;

an enclosure which contains an optical system that includes the semiconductor laser and the objective lens;

an elastic supporting member which movably supports the enclosure; and a plurality of magnets which are contained in the enclosure and positioned symmetrically with respect to an optical axis of the laser beam, wherein the laser beam passes through a space formed between the plurality of magnets in a path that is substantially parallel with a surface of the optical recording medium, and wherein the plurality of magnets generate magnetic forces with a plurality of pairs of driving coils, to generate magnetic fluxes for driving the objective lens at least in a focusing direction and a tracking direction.

8. The optical pickup of claim 7, wherein the objective lens and the semiconductor laser are positioned at opposite ends of the enclosure, so that a position of a center of gravity of the enclosure with the objective lens and the semiconductor laser in a direction of the optical axis substantially coincides with a position of a supporting point of the enclosure by the elastic supporting member in the direction of the optical axis.

9. The optical pickup of claim 8, wherein the elastic supporting member is made up of at least six conductive members, at least two of which function as lines for supplying electric power to the semiconductor laser.

10. The optical pickup of claim 7, wherein the elastic supporting member is made up of at least six conductive members, at least two of which function as lines for supplying electric power to the semiconductor laser.

* * * * *